United States Patent
Morin et al.

(10) Patent No.: US 10,131,455 B2
(45) Date of Patent: Nov. 20, 2018

(54) APPARATUS AND METHOD FOR INDUCTION SEALING OF CONVEYED WORKPIECES

(75) Inventors: Jeremy Morin, Canal Fulton, OH (US); Trevor Price, North Canton, OH (US)

(73) Assignee: SONOCO DEVELOPMENT, INC., Hartsville, SC (US)

(*) Notice: Subject to any disclaimer, the term of this patent is extended or adjusted under 35 U.S.C. 154(b) by 1405 days.

(21) Appl. No.: 13/284,056

(22) Filed: Oct. 28, 2011

(65) Prior Publication Data
US 2013/0105467 A1    May 2, 2013

(51) Int. Cl.
*H05B 6/02*      (2006.01)
*B29C 65/02*    (2006.01)
(Continued)

(52) U.S. Cl.
CPC .......... *B65B 7/2878* (2013.01); *B65B 51/227* (2013.01); *B29C 65/46* (2013.01); *B29C 65/7873* (2013.01); *B29C 66/12441* (2013.01); *B29C 66/545* (2013.01); *B29C 66/5432* (2013.01); *B29C 66/742* (2013.01)

(58) Field of Classification Search
CPC . B65B 51/227; B29C 66/542; B29C 65/3644; B29C 65/00; B29C 65/368; B29C 65/3656; B29C 65/3668; H05B 6/10; H05B 6/101; H05B 6/103; H05B 6/44; H05B 6/40
USPC ........ 159/156; 219/603, 633, 604, 656, 632, 219/671, 672, 655, 653
See application file for complete search history.

(56) References Cited

U.S. PATENT DOCUMENTS

| | | |
|---|---|---|
| 2,828,903 A | 4/1958 | Adkins |
| 3,073,478 A | 1/1963 | Henchert |
| | (Continued) | |

FOREIGN PATENT DOCUMENTS

| | | |
|---|---|---|
| CA | 2 489 218 A1 | 7/2005 |
| CH | 422 690 | 10/1966 |
| | (Continued) | |

OTHER PUBLICATIONS eLIBRARY.RU—Advances in fusion bonding techniques for joining thermoplastic matri . . . [online][retrieved Jan. 14, 2011]. Retrieved from the Internet: <URL: http://elibrary.ru/item.asp?id=585705>, 1 page.
(Continued)

*Primary Examiner* — Dana Ross
*Assistant Examiner* — Lawrence Samuels
(74) *Attorney, Agent, or Firm* — Neslon Mullins Riley and Scarborough LLP (57) ABSTRACT

Apparatus and method for induction sealing workpieces, in which a series of workpieces are conveyed along a path extending in a conveyance direction, and each workpiece is exposed to a first electromagnetic field generated by a first induction head and to a second electromagnetic field generated by a second induction head, each of the first and second electromagnetic fields inducing eddy currents through the entirety of each workpiece. Respective magnetic axes of the first and second induction heads are non-parallel to each other such that each workpiece is exposed to a plurality of differently oriented electromagnetic fields as the workpiece is conveyed along the path.

25 Claims, 4 Drawing Sheets

(51) Int. Cl.
  *B65B 7/28*    (2006.01)
  *B65B 51/22*   (2006.01)
  *B29C 65/46*       (2006.01)
  *B29C 65/78*       (2006.01)
  *B29C 65/00*       (2006.01)

(56) References Cited

U.S. PATENT DOCUMENTS

| | | | |
|---|---|---|---|
| 3,405,439 A | 10/1968 | Sozaburo | |
| 3,406,891 A | 10/1968 | Buchner et al. | |
| 3,549,440 A | 12/1970 | Adcock et al. | |
| 3,616,047 A | 10/1971 | Kehe | |
| 3,625,785 A | 12/1971 | Holmstrom et al. | |
| 3,694,609 A | 9/1972 | Kennedy | |
| 3,774,801 A | 11/1973 | Gedde | |
| 3,843,014 A | 10/1974 | Cospen et al. | |
| 3,868,917 A | 3/1975 | Arfert | |
| 3,909,326 A | 9/1975 | Renck | |
| 3,912,154 A | 10/1975 | Godar | |
| 3,934,749 A | 1/1976 | Andrulionis | |
| 3,978,232 A | 8/1976 | Dodsworth et al. | |
| 3,988,185 A | 10/1976 | Johnson et al. | |
| 4,093,102 A | 6/1978 | Kraska | |
| 4,095,390 A | 6/1978 | Knudsen | |
| 4,217,843 A | 8/1980 | Kraska | |
| 4,241,864 A | 12/1980 | Kessler | |
| 4,448,322 A | 5/1984 | Kraska | |
| 4,530,442 A | 7/1985 | Vogel, Jr. et al. | |
| 4,538,758 A | 9/1985 | Griffith | |
| 4,588,621 A | 5/1986 | Bunel et al. | |
| 4,606,472 A | 8/1986 | Taube et al. | |
| 4,626,157 A | 12/1986 | Franek et al. | |
| 4,643,330 A * | 2/1987 | Kennedy | 220/288 |
| 4,667,842 A | 5/1987 | Collins | |
| 4,674,649 A | 6/1987 | Pavely | |
| 4,711,362 A | 12/1987 | Korcz et al. | |
| 4,716,755 A | 1/1988 | Bulso, Jr. et al. | |
| 4,735,339 A | 4/1988 | Benge et al. | |
| 4,808,052 A | 2/1989 | Bulso, Jr. et al. | |
| 4,809,861 A | 3/1989 | Wilkinson et al. | |
| 4,890,759 A | 1/1990 | Scanga et al. | |
| 4,891,484 A | 1/1990 | Waggott et al. | |
| 4,940,158 A | 7/1990 | Farrell et al. | |
| 4,941,306 A | 7/1990 | Pfaffmann et al. | |
| 4,948,006 A | 8/1990 | Okabe et al. | |
| 4,991,735 A | 2/1991 | Biondich | |
| 5,025,123 A | 6/1991 | Pfaffmann et al. | |
| 5,025,124 A * | 6/1991 | Alfredeen | 219/673 |
| 5,046,637 A | 9/1991 | Kysh | |
| 5,053,593 A | 10/1991 | Iguchi | |
| 5,069,355 A | 12/1991 | Matuszak | |
| 5,071,029 A | 12/1991 | Umlah et al. | |
| 5,257,709 A | 11/1993 | Okabe et al. | |
| 5,331,127 A | 7/1994 | Chen | |
| 5,360,498 A * | 11/1994 | Blomqvist et al. | 156/73.1 |
| 5,562,799 A * | 10/1996 | Ross et al. | 156/567 |
| 5,590,807 A | 1/1997 | Forrest et al. | |
| 5,598,734 A | 2/1997 | Forrest et al. | |
| 5,721,028 A | 2/1998 | Suzuki et al. | |
| 5,847,370 A | 12/1998 | Sluka et al. | |
| 5,858,141 A | 1/1999 | Repp et al. | |
| 5,971,259 A | 10/1999 | Bacon | |
| 5,977,527 A * | 11/1999 | Preston et al. | 219/615 |
| 6,043,471 A | 3/2000 | Wiseman et al. | |
| 6,078,033 A | 6/2000 | Bowers et al. | |
| 6,079,185 A | 6/2000 | Palaniappan et al. | |
| 6,102,243 A | 8/2000 | Fields et al. | |
| 6,104,013 A | 8/2000 | Miller | |
| 6,116,500 A | 9/2000 | Cahill | |
| 6,194,041 B1 | 2/2001 | McHenry et al. | |
| 6,262,402 B1 * | 7/2001 | Isoyama et al. | 219/603 |
| 6,408,498 B1 | 6/2002 | Fields et al. | |
| 6,412,252 B1 | 7/2002 | Sarles et al. | |
| 6,419,110 B1 | 7/2002 | Stodd | |
| 6,460,723 B2 | 10/2002 | Nguyen et al. | |
| 6,477,823 B1 | 11/2002 | Kitterman et al. | |
| 6,499,622 B1 | 12/2002 | Neiner | |
| 6,516,968 B2 | 2/2003 | Stodd | |
| 6,555,801 B1 | 4/2003 | LeMieux et al. | |
| 6,629,399 B2 | 10/2003 | Sarles et al. | |
| 6,702,142 B2 | 3/2004 | Neiner | |
| 6,725,630 B2 | 4/2004 | Rea et al. | |
| 6,732,495 B2 | 5/2004 | Sarles et al. | |
| 6,736,283 B1 | 5/2004 | Santamaria et al. | |
| 6,747,252 B2 * | 6/2004 | Herzog | 219/633 |
| 6,875,965 B2 | 4/2005 | Herzog | |
| 6,915,553 B2 | 7/2005 | Turner et al. | |
| 6,964,796 B1 | 11/2005 | Koyama et al. | |
| 7,065,941 B2 | 6/2006 | Sarles et al. | |
| 7,100,789 B2 | 9/2006 | Nguyen et al. | |
| 7,119,310 B2 | 10/2006 | Hammen et al. | |
| 7,137,524 B2 | 11/2006 | Nomula | |
| 7,174,762 B2 | 2/2007 | Turner et al. | |
| 7,318,536 B2 | 1/2008 | Maravich et al. | |
| 7,341,163 B2 | 3/2008 | Stodd | |
| 7,370,774 B2 | 5/2008 | Watson et al. | |
| 7,380,684 B2 | 6/2008 | Reed et al. | |
| 7,484,639 B2 | 2/2009 | Maravich et al. | |
| 7,591,392 B2 | 9/2009 | Watson et al. | |
| 7,772,518 B2 | 8/2010 | Rajesh et al. | |
| 8,360,125 B2 * | 1/2013 | Schwiese et al. | 156/380.2 |
| 2001/0032839 A1 * | 10/2001 | Herzog | 219/633 |
| 2003/0089079 A1 | 5/2003 | Rea et al. | |
| 2005/0029269 A1 | 2/2005 | Stodd et al. | |
| 2005/0252918 A1 | 11/2005 | McKnight et al. | |
| 2006/0071005 A1 | 4/2006 | Bulso | |
| 2006/0186127 A1 | 8/2006 | Rajesh et al. | |
| 2006/0191940 A1 | 8/2006 | Heyn | |
| 2007/0095847 A1 | 5/2007 | Gruver et al. | |
| 2007/0187352 A1 | 8/2007 | Kras et al. | |
| 2008/0041867 A1 | 2/2008 | Jochem et al. | |
| 2008/0050207 A1 | 2/2008 | Turner et al. | |
| 2008/0216960 A1 * | 9/2008 | Schwiese et al. | 156/380.2 |
| 2009/0020543 A1 | 1/2009 | Bulso | |
| 2009/0230079 A1 | 9/2009 | Smolko | |
| 2009/0257847 A1 | 10/2009 | Schumann et al. | |
| 2009/0269169 A1 | 10/2009 | Turner et al. | |
| 2010/0006532 A1 | 1/2010 | Lee | |
| 2010/0006571 A1 | 1/2010 | Shibasaka et al. | |
| 2010/0038365 A1 | 2/2010 | Ishida et al. | |
| 2010/0176134 A1 | 7/2010 | Cramer | |
| 2011/0095030 A1 | 4/2011 | Dunn et al. | |
| 2011/0226787 A1 | 9/2011 | Yourist | |
| 2012/0321415 A1 | 12/2012 | Price et al. | |
| 2013/0059048 A1 | 3/2013 | Price et al. | |
| 2013/0272820 A1 | 10/2013 | Price et al. | |

FOREIGN PATENT DOCUMENTS

| | | |
|---|---|---|
| EP | 0 099 159 A2 | 1/1984 |
| EP | 0 420 519 A1 | 4/1991 |
| EP | 0742152 | 11/1996 |
| GB | 1 078 696 | 8/1967 |
| GB | 1207306 | 9/1970 |
| GB | 2 051 627 A | 1/1981 |
| GB | 2 067 158 | 7/1981 |
| GB | 2 384 478 A | 7/2003 |
| JP | 8-151041 A | 6/1996 |
| WO | WO 95/34469 A1 | 12/1995 |
| WO | WO 96/37414 A1 | 11/1996 |
| WO | WO 2006/050465 A1 | 5/2006 |
| WO | WO 2007/014211 A1 | 2/2007 |
| WO | WO 2011/053451 A1 | 5/2011 |

OTHER PUBLICATIONS

International Search Report and Written Opinion for Application No. PCT/US2013/035283 dated Jun. 25, 2013.
International Search Report for Application No. PCT/US2012/061615; dated Feb. 6, 2013.
U.S. Appl. No. 13/161,713, filed Jun. 16, 2011; first named inventor: Price.

(56) References Cited

OTHER PUBLICATIONS

Notice of Allowance for U.S. Appl. No. 13/224,651 dated Dec. 5, 2014.
International Preliminary Report on Patentability/Written Opinion for Application No. PCT/US2012/061615 dated Apr. 29, 2014.
International Search Report/Written Opinion for Application No. PCT/US2012/053062 dated Nov. 5, 2012.
International Preliminary Report on Patentability for Application No. PCT/US2012/053062 dated Mar. 4, 2014.
Office Action for U.S. Appl. No. 13/224,651 dated Mar. 28, 2014.
Office Action for U.S. Appl. No. 13/224,651 dated Jul. 10, 2014.
Office Action for Chinese Patent Application No. 201280053353.7 dated Jun. 3, 2015.
Notice of Allowance for U.S. Appl. No. 14/638,420 dated Jul. 22, 2016.
Office Action for U.S. Appl. No. 13/445,162 dated Aug. 11, 2016.
Office Action for Canadian Application No. 2,870,266 dated Jul. 27, 2016.
Office Action from Canadian Patent Application No. 2,870,266 dated Feb. 22, 2017.

\* cited by examiner

APPARATUS AND METHOD FOR INDUCTION SEALING OF CONVEYED WORKPIECES

BACKGROUND OF THE INVENTION

The present disclosure relates generally to induction heating, and more particularly to induction sealing in which a workpiece is sealed, for example, to another structure, via inductive heating of a heat-sealable material disposed therebetween. Still more particularly, the disclosure relates to induction sealing of lids, closures, caps, or the like, to containers such as cans, jars, bottles, or the like.

It is known to induction seal a lid or cap to a container. For example, U.S. Pat. No. 3,909,326 to Renck describes a method for applying a heat-sealable membrane to a mouth of a container. A heat-sealable packaging material, which preferably includes at least a heat-sealable membrane and a metal foil, is applied to the mouth of each container. A conveyor for conveying the containers is driven by means of a motor. A continuous belt spaced above the conveyor is driven by means of a drive assembly also coupled to the motor.

An overcap is also placed over the container so as to restrain the heat-sealable member and prevent its movement during movement of the container through the apparatus. The container with the heat sealable packaging material in place is then moved onto the conveyor. The conveyor passes the container into position under the continuous belt. The continuous belt is controlled to move at the same speed as the conveyor so that there is no differential motion between the continuous belt and the conveyor. The continuous belt presses down upon the mouth of the container and holds the heat-sealable packaging material tightly in position as the container is passed under an induction coil. The induction coil is energized with sufficient power to heat the metal foil laminate of heat-sealable member and to cause the metal foil laminate to attain a sufficient temperature to activate the heat-sealing membrane of the heat-sealable packaging material.

Variations in the type of apparatus and process described in the '326 patent have been proposed, mainly addressing ways of achieving intimate contact between the heat-sealable lid and the container mouth during induction heating and subsequent cooling; see, for example: U.S. Pat. Nos. 4,095,390; 5,562,799; and 5,858,141. While these developments in some cases have provided useful contributions to the state of the art, further improvement in induction sealing apparatuses and methods is sought.

BRIEF SUMMARY OF THE INVENTION

The present disclosure describes an apparatus and method for induction sealing of workpieces. The particular embodiments of the invention described herein relate to induction sealing of closures, and specifically metal ends, to containers, but the invention is more generally applicable to induction sealing of any workpieces that are induction-sealable. To be "induction-sealable" as used herein, a workpiece must meet two requirements: (1) either the workpiece itself has, or the workpiece is in heat-conductive communication with another structure that has, a metal component in which eddy currents can be induced in an alternating electromagnetic field; and (2) either the workpiece itself has, or the workpiece is in physical contact with another structure that has, a thermoplastic material that can be heated by the inductive heating of the metal component so that the thermoplastic material will melt when heated to a sufficiently high temperature, and will re-solidify when cooled.

As noted, a particular application of the inventive apparatus and method is for sealing of metal ends to containers. The inventors discovered, during trials of a commercially available inductive sealing apparatus and method generally of the type described in the above-noted '326 patent, that the induction heating coil provided non-uniform heating, and therefore non-uniform sealing of the metal end to the container. Specifically, going around the circumference of a given metal end, there were "hot spots" where the thermoplastic material evidently had been heated sufficiently to achieve a good seal, but there were also "cold spots" where evidently the thermoplastic had not been heated sufficiently. These cold spots could be areas of weakness where the seal could be breached, for example under conditions of high internal pressure in the container, which could occur, for instance, during retort processing of the container. The present invention was developed as a result of efforts to solve this non-uniform heating problem.

One embodiment described herein is a multiple-head induction sealer for inductively sealing each of a series of workpieces being conveyed along a conveyance direction and adjacent to the sealer. The sealer comprises:

(a) a first induction head and at least one additional, second induction head, arranged along the conveyance direction;

(b) the first induction head comprising a first coil and a first core and defining a first magnetic axis, the second induction head comprising a second coil and a second core and defining a second magnetic axis;

(c) each of the first and second induction heads being configured and arranged to induce eddy currents through the entirety of each workpiece; and (d) the first and second magnetic axes being non-parallel to each other such that each workpiece is exposed to a plurality of differently oriented electromagnetic fields as the workpiece is conveyed along the conveyance direction.

In one embodiment, the first and second magnetic axes are substantially perpendicular to each other. For example, the first magnetic axis can be oriented substantially parallel to the conveyance direction and the second magnetic axis can be oriented substantially perpendicular to the conveyance direction.

In one embodiment, the first and second magnetic axes are substantially coplanar with each other.

An included angle between the first and second magnetic axes can range from about 30° to about 90°.

It has been found that by using multiple induction heads each acting upon the entirety of each workpiece but having differing orientations, a more-uniform heating of the workpieces can be achieved.

The apparatus can further include a cooling device located downstream of the induction heads with respect to the conveyance direction, the cooling device being operable to cool the workpieces after induction sealing. The cooling device can be any suitable device that is able to cool the workpieces after induction sealing, examples of which include a water spray device, an air knife, or a water bath.

The present disclosure also includes a method for induction sealing. In one embodiment, a method of induction sealing comprises the steps of:

conveying a series of workpieces along a path extending in a conveyance direction; and exposing each workpiece to a first electromagnetic field generated by a first induction head and to a second electromagnetic field generated by a second induction head located adjacent the path, each of the first and second electromagnetic fields inducing eddy currents through the entirety of each workpiece;

wherein respective magnetic axes of the first and second induction heads are non-parallel to each other such that each workpiece is exposed to a plurality of differently oriented electromagnetic fields as the workpiece is conveyed along the path.

The method can also include the step of cooling the workpieces at a location downstream of the induction heads with respect to the conveyance direction.

In one embodiment, the workpieces comprise containers each comprising a container body and a metal end engaged with one end of the container body, and at least one of the metal end and the container body of each workpiece has a heat-sealable material. The first and second electromagnetic fields generate eddy currents in the metal ends so as to heat the heat-sealable material and seal the metal ends to the container bodies.

The containers can be conveyed atop a conveyor, with the metal ends engaged with upper ends of the container bodies, beneath the first and second induction heads.

The method can further comprise the step of applying pressure on the metal ends against the container bodies as the first and second electromagnetic fields are inducing eddy currents in the metal ends and during the subsequent cooling after the containers leave the induction-sealing zone. The step of applying pressure can comprise the metal ends with an endless belt spaced above and parallel to the conveyor and traveling at a speed matching that of the conveyor. The belt prevents the containers from growing in height and thus effectively clamps the metal ends on the container bodies. The vertical position of the belt can be adjustable to accommodate containers of different heights.

As noted, the method can include the step of cooling the metal ends at a location downstream of the induction heads with respect to the conveyance direction. The cooling step can occur while the belt is still applying pressure on the metal ends.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The drawings are not necessarily to scale, and thus the relative proportions of various elements suggested by the drawings is not necessarily indicative of the actual relative proportions.

Figure 1:
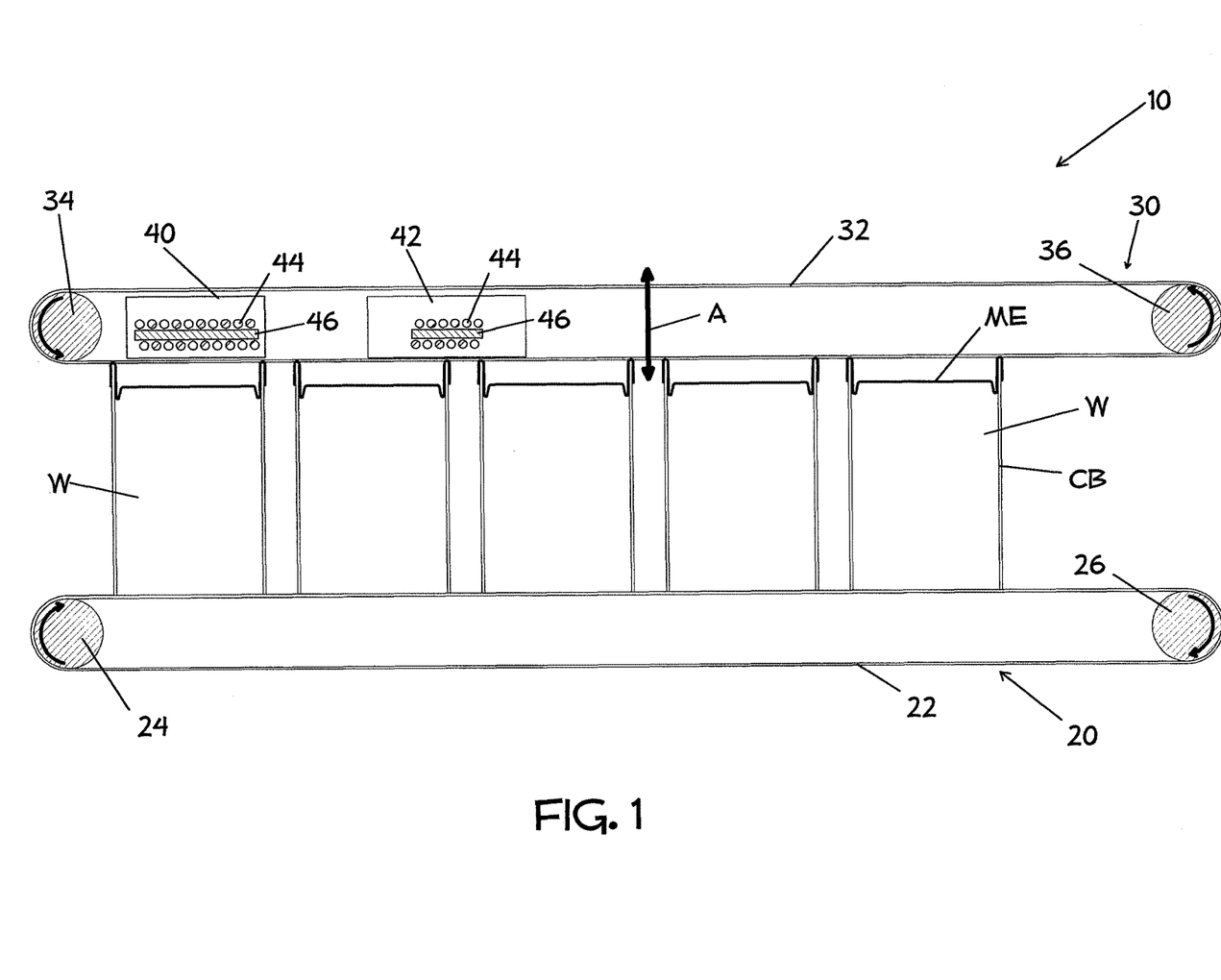
FIG. 1 is cross-sectional view of an apparatus, along line 1-1 in FIG. 2, in accordance with an embodiment of the invention, showing one step of a method in accordance with an embodiment of the invention.

With reference to FIG. 1, a multi-head induction sealer 10 in accordance with one embodiment of the invention is depicted in a diagrammatic cross-sectional view. The sealer 10 includes a conveyor 20 comprising an endless belt 22 looped about a pair of spaced parallel rolls 24, 26. At least one of the rolls 24, 26 is rotatably driven about its axis and in turn drives the belt 22. As shown in FIG. 1, the rolls 24, 26 rotate clockwise and the belt 22 thus travels clockwise such that its upper flight moves from left to right in the figure. The belt 22 supports a series of workpieces W on the upper flight of the belt. In the illustrated embodiment, the workpieces W comprise containers. Each container has a container body CB and a metal end ME. The present invention is applicable to any container whose closure or end is induction-sealable to the container body, including but not limited to containers having: a metal body and a metal end; a plastic body and a metal end; a composite body and a metal end; a metal body and a plastic end; a composite body and a plastic end; a plastic body and a composite end; etc. (where "composite" is understood to include a metal foil layer).

FIG. 1 depicts a step in a process of sealing metal ends to the ends of the container bodies. Each container body CB is open at both its opposite ends, and a first step in the process of applying and sealing metal ends to the container body is to apply and seam a metal end ME to one end of the container body. This applying and seaming step is not depicted in the drawings, but is known to those skilled in the art. One or both of the metal end ME and the container body CB has a thermoplastic or heat-sealable material present on a surface thereof opposing the other component, for purposes to be described below.

Once metal ends are seamed onto one end of each of a series of container bodies, the containers are loaded (by suitable means, not shown) onto the conveyor 20. There is a gap between adjacent containers in the conveyance direction (i.e., the left-to-right direction in FIGS. 1 and 3), as illustrated. This gap may be maintained in a uniform fashion by, for example, configuring the belt 22 to have a series of uniformly spaced recesses each of which receives a container W. The belt 22 can be a "single-lane" or "multiple-lane" belt. A single-lane belt has a single row of such recesses extending in the longitudinal (conveyance) direction. A multiple-lane belt has two or more such rows spaced apart widthwise on the belt so that multiple series of containers can be conveyed simultaneously through the induction sealing process. The open ends of the container bodies are against the belt 22 and the metal ends ME are located at the upper ends of the container bodies.

The apparatus 10 further includes a pressure belt 30 comprising an endless belt 32 looped about a pair of spaced parallel rolls 34, 36. At least one of the rolls 34, 36 is rotatably driven about its axis and in turn drives the belt 32. As shown in FIG. 1, the rolls 34, 36 rotate counterclockwise and the belt 32 thus travels counterclockwise such that its lower flight moves from left to right in the figure. The pressure belt 32 is driven to travel at the same linear speed as that of the conveyor belt 22, and the pressure belt is arranged so that its lower flight presses down on the metal ends ME in a downward direction toward the conveyor 20.

Disposed within the loop of (as illustrated), or adjacent to a lower flight of (not shown), the pressure belt 32 are a plurality of induction heads. In the illustrated embodiment, there are two such induction heads 40, 42, but the invention is not limited to two heads, and three or more can be used if desired in a particular application. Each induction head comprises a wire coil 44 and a ferrous core 46, depicted schematically in the figures. While induction heads 40 and 42 are depicted as being discrete, contained in separate respective housings, it is also within the scope of the invention to have two or more induction heads within a given housing. The wire coil of each induction head is wound in a particular configuration so as to produce the desired electromagnetic field when an alternating electrical current is passed through the wire. In particular, as known to those skilled in the art, the coil configuration dictates the pattern and strength of the electromagnetic field for a given AC current. In accordance with the present invention, the induction heads 40, 42 have differently oriented electromagnetic fields.

More particularly, the magnetic axis A1 of the first induction head 40 is not parallel to the magnetic axis A2 of the second induction head 42. In the embodiment illustrated in FIG. 3, the magnetic axis A1 of the first induction head 40 is shown as parallel to the conveyance direction, while the magnetic axis A2 of the second induction head 42 is oblique to the conveyance direction. Both magnetic axes can be parallel to the plane defined by the lower flight of the pressure belt 30, and they can be coplanar with each other or can lie in different planes. The illustrated orientations of the magnetic axes A1, A2 are exemplary only, and other orientations can be used, as long as the two magnetic axes are differently oriented. For example, the second magnetic axis A2 could be perpendicular to the conveyance direction such that the two axes are perpendicular to each other; as another example, both magnetic axes could be oblique to the conveyance direction. An included angle between the first and second magnetic axes can range from about 30° to about 90°.

Figure 2:
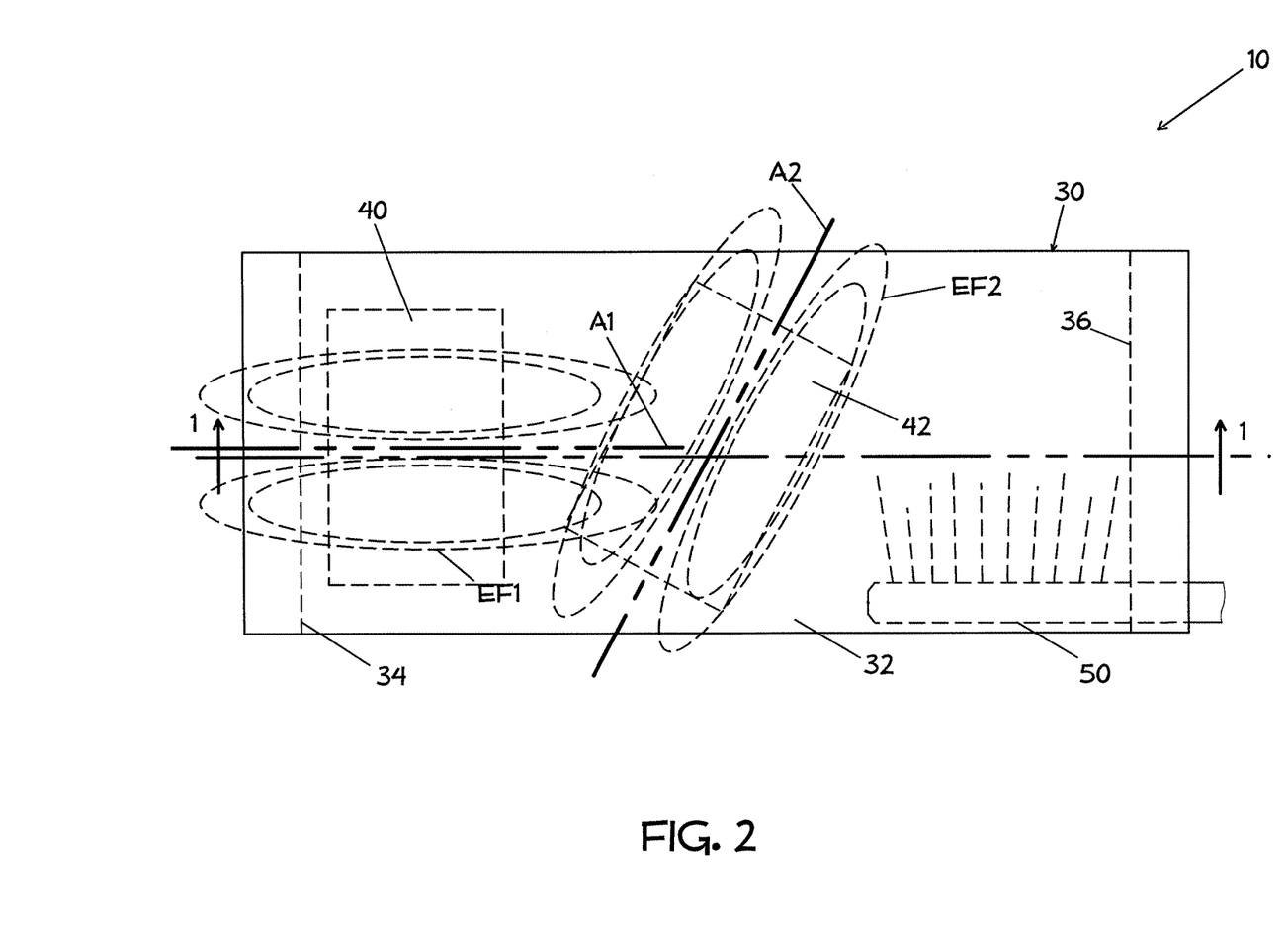
FIG. 2 is a top view of the apparatus of FIG. 1.

As a result of the differently oriented magnetic axes of the induction heads 40, 42, each workpiece/container W is subjected to a plurality of differently oriented electromagnetic fields as it is carried on the conveyor 20 along the conveyance direction. Thus, the electromagnetic field of the first induction head 40, schematically illustrated by field lines EF1 in FIG. 2, induces eddy currents through the entirety of a metal end ME when it comes beneath the head 40, and the electromagnetic field of the second induction head 42 having field lines EF2 induces eddy currents through the entirety of the metal end ME when it comes beneath the head 42. These eddy currents heat the metal layer of the metal end and this heat is conducted to the heat-sealable thermoplastic material. Because the two fields are differently oriented, it is highly unlikely that a given spot on the metal end ME will be a "cold spot" where the heat-sealable thermoplastic fails to be heated sufficiently to seal the metal end to the container body. That is, while a given spot on the metal end may be in a weak zone of the electromagnetic field of one of the induction heads, it is highly unlikely that the spot will also be in a weak zone of the other electromagnetic field. In this way, more-uniform heating of each metal end may be achieved, in comparison to a sealing apparatus having a single induction head or having multiple induction heads all oriented the same.

The containers or workpieces W thus have the metal ends ME sealed to the one end of the container bodies CB by the action of the induction heads 40, 42. As the containers are conveyed beyond the induction heads on the conveyor 20, a cooling device 50 (FIG. 2) such as an air knife, water sprayer, or the like, provides cooling to the metal ends while the pressure belt 30 is still applying pressure on the metal ends to keep them from coming off the container bodies. As noted, the pressure belt 30 can be vertically adjustable, as denoted by arrow A in FIG. 1, to accommodate containers of different heights. The pressure belt 30 acts to prevent the containers from growing in height, and thus effectively clamps the metal ends on the container bodies during the cooling process. The cooling of the ends by the cooling device 50 ensures that the heat-sealable thermoplastic material is solidified before the containers are discharged from the conveyor 20.

Figure 3:
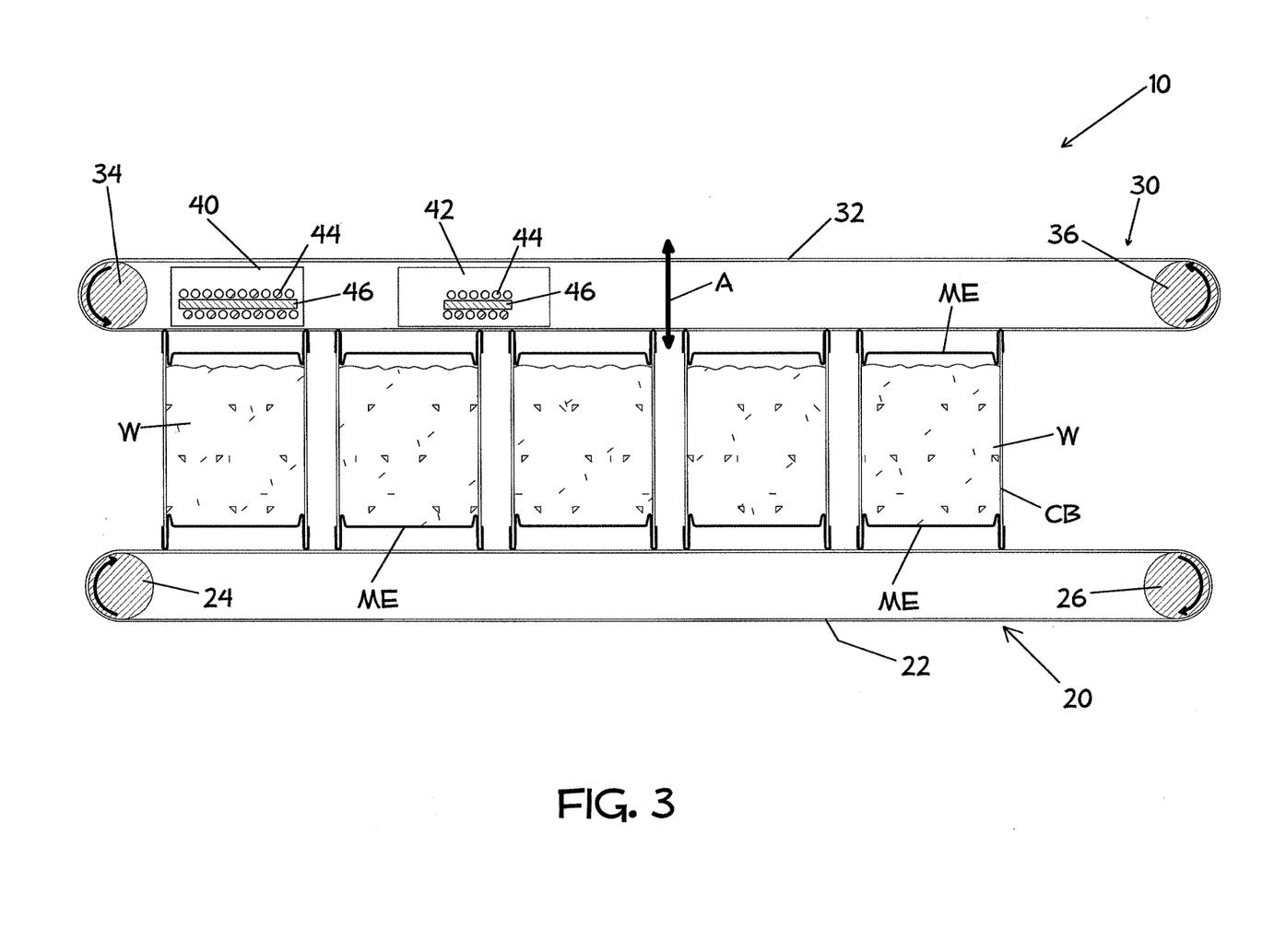
FIG. 3 is a view similar to FIG. 1, showing a further step of a method in accordance with an embodiment of the invention.

Containers produced by the process explained above and depicted in FIG. 1 are of course only partially completed, but are in condition to be filled with the desired contents and sealed closed. FIG. 3 depicts the process of sealing the filled containers closed. After the containers are filled and metal ends are applied and seamed onto the open ends, the containers are again loaded onto the conveyor 20 for a second pass through the apparatus 10. It will be understood, of course, that the apparatus 10 of FIG. 3 may be a duplicate of the apparatus 10 of FIG. 1, and may be located at a different site from that of FIG. 1. For example, at a first site, partial container assemblies, consisting of container bodies CB closed at only one end by metal ends ME may be produced as in FIG. 1. These assemblies may be transported to a second site at which another apparatus 10 is located. At this second site, the containers may be filled, metal ends may be seamed onto the open ends to close them, and then these filled containers may be loaded onto the conveyor 20 of the apparatus 10.

In the second pass through the apparatus 10 illustrated in FIG. 3, the process of FIG. 1 is essentially repeated to seal the metal ends ME onto the container bodies CB. Again, the induction heads 40, 42 heat the metal ends ME to seal them onto the container bodies, and the cooling device 50 cools the metal ends before the containers are discharged from the conveyor 20.

Figure 4:
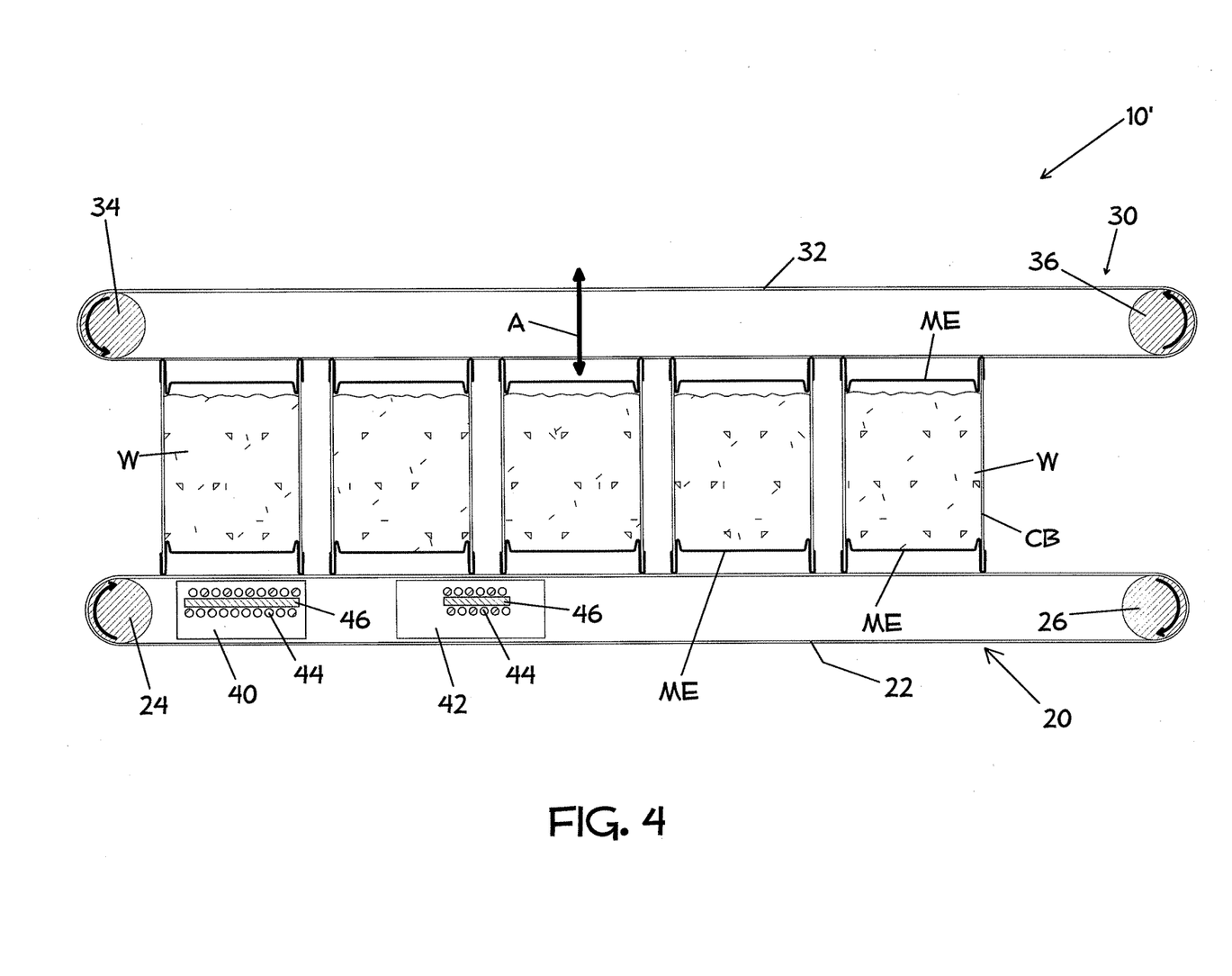
FIG. 4 is a view similar to FIG. 3, but illustrating an alternative embodiment of the invention.

FIG. 4 depicts an apparatus 10' in accordance with an alternative embodiment of the invention. The apparatus 10' differs from the apparatus 10 previously described in that the induction heads 40, 42 are located within the loop of (as illustrated), or adjacent to a lower flight of (not shown), the lower belt 22 rather than the upper pressure belt 32. With this arrangement, the product within the containers acts as a heat sink when the second metal end is induction-sealed to each container.

In the embodiments illustrated and described above, the conveyance path for the workpieces is linear. The present invention, however, is not limited to any particular conveyor configuration. For example, a rotary conveyor (turntable, turret, etc.) can be used for conveying workpieces and multiple induction heads can be disposed adjacent the resulting circular conveyance path for exposing the workpieces to a plurality of differently oriented electromagnetic fields, in a manner closely analogous to that described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multiple-head induction sealer for inductively sealing each of a series of workpieces being conveyed along a conveyance direction and adjacent to the sealer, the sealer comprising:
   (a) a first induction head and at least one additional, second induction head, arranged along the conveyance direction;
   (b) the first induction head comprising a first coil and a first core and defining a first magnetic axis, the second induction head comprising a second coil and a second core and defining a second magnetic axis;
   (c) each of the first and second induction heads being configured and arranged to induce eddy currents through the entirety of each workpiece; and
   (d) the first magnetic axis has a non-zero first angle in relation to the conveyance direction and the second magnetic axis has a non-zero second angle in relation to the conveyance direction, wherein the first angle and the second angle are different, such that each workpiece is exposed to a plurality of differently oriented electromagnetic fields as the workpiece is conveyed along the conveyance direction.

2. The multiple-head induction sealer of claim 1, wherein the first and second magnetic axes are substantially perpendicular to each other.

3. The multiple-head induction sealer of claim 2, wherein the first magnetic axis is oriented substantially parallel to the conveyance direction and the second magnetic axis is oriented substantially perpendicular to the conveyance direction.

4. The multiple-head induction sealer of claim 2, wherein the first and second magnetic axes are substantially coplanar with each other.

5. The multiple-head induction sealer of claim 1, wherein an included angle between the first and second magnetic axes ranges from about 30° to about 90°.

6. The multiple-head induction sealer of claim 1, further comprising a cooling device located downstream of the induction heads with respect to the conveyance direction, the cooling device being operable to cool the workpieces after induction sealing.

7. The multiple-head induction sealer of claim 6, wherein the cooling device comprises a water spray device.

8. The multiple-head induction sealer of claim 6, wherein the cooling device comprises an air cooling device.

9. The multiple-head induction sealer of claim 6, wherein the cooling device comprises a water bath.

10. The multiple-head induction sealer of claim 6, wherein the workpieces comprise containers each comprising a container body and a metal end engaged with one end of the container body, and at least one of the metal end and the container body of each workpiece has a heat-sealable material, and further comprising:
   a conveyor atop which the containers are conveyed along the conveyance direction, with the metal ends engaged with upper ends of the container bodies, beneath the first and second induction heads such that the first and second electromagnetic fields generate eddy currents in the metal ends so as to heat the heat-sealable material and seal the metal ends to the container bodies;
   an endless pressure belt spaced above and parallel to the conveyor and traveling at a speed matching that of the conveyor, the pressure belt applying pressure on the metal ends in a direction toward the conveyor to prevent the containers from growing in height; and
   a cooling device located downstream of the induction heads with respect to the conveyance direction, the cooling device being operable to cool the workpieces after induction sealing and while the pressure belt is applying pressure on the metal ends.

11. A method for induction sealing, comprising the steps of:
   conveying a series of workpieces along a path extending in a conveyance direction; and
   exposing each workpiece to a first electromagnetic field generated by a first induction head and to a second electromagnetic field generated by a second induction head, each of the first and second electromagnetic fields inducing eddy currents through the entirety of each workpiece;
   wherein the first magnetic axis has a non-zero first angle in relation to the conveyance direction and the second magnetic axis has a non-zero second angle in relation to the conveyance direction, and wherein the first angle and the second angle are different, such that each workpiece is exposed to a plurality of differently oriented electromagnetic fields as the workpiece is conveyed along the conveyance direction.

12. The method of claim 11, wherein the magnetic axes of the first and second induction heads are substantially perpendicular to each other.

13. The method of claim 11, wherein the magnetic axis of one of the first and second induction heads is oriented substantially parallel to the conveyance direction and the magnetic axis of the other of the first and second induction heads is oriented substantially perpendicular to the conveyance direction.

14. The method of claim 11, wherein the magnetic axes of the first and second induction heads are substantially coplanar with each other.

15. The method of claim 11, wherein an included angle between the magnetic axes of the first and second induction heads ranges from about 30° to about 90°.

16. The method of claim 11, further comprising the step of cooling the workpieces at a location downstream of the induction heads with respect to the conveyance direction.

17. The method of claim 11, wherein the workpieces comprise containers each comprising a container body and a metal end engaged with one end of the container body, and at least one of the metal end and the container body of each workpiece has a heat-sealable material, wherein the first and second electromagnetic fields generate eddy currents in the metal ends so as to heat the heat-sealable material and seal the metal ends to the container bodies.

18. The method of claim 17, wherein the containers are conveyed atop a conveyor, with the metal ends engaged with upper ends of the container bodies, beneath the first and second induction heads.

19. The method of claim 18, further comprising the step of applying pressure on the metal ends against the container bodies as the first and second electromagnetic fields are inducing eddy currents in the metal ends.

20. The method of claim 19, wherein the step of applying pressure comprises engaging the metal ends with an endless belt spaced above and parallel to the conveyor and traveling at a speed matching that of the conveyor, the belt applying pressure on the metal ends in a direction toward the conveyor.

21. The method of claim 20, further comprising the step of cooling the metal ends at a location downstream of the induction heads with respect to the conveyance direction.

22. The method of claim 21, wherein the cooling step occurs while the belt is still applying pressure on the metal ends.

23. The multiple-head induction sealer of claim 1, wherein the first and second magnetic axes lie in different planes.

24. The multiple-head induction sealer of claim 10, wherein the endless pressure belt comprises an endless belt looped about a pair of spaced parallel rolls and wherein the first induction head and second induction head are disposed within the loop of the endless pressure belt.

25. The multiple-head induction sealer of claim 10, wherein the conveyor comprises an endless belt looped about a pair of spaced parallel rolls and wherein the first induction head and second induction head are disposed within the loop of the endless belt conveyor.

* * * * *